United States Patent [19]

Mack

[11] 4,211,123
[45] Jul. 8, 1980

[54] MOTION CONVERSION MECHANISM

[75] Inventor: James F. Mack, Flagstaff, Ariz.

[73] Assignee: Mack Corporation, Flagstaff, Ariz.

[21] Appl. No.: 885,557

[22] Filed: Mar. 13, 1978

[51] Int. Cl.² ............................................. F16H 21/44
[52] U.S. Cl. .................................. 74/99 A; 279/2 A; 294/116; 294/88; 269/34
[58] Field of Search ............. 279/2 R, 2 A; 242/72 R, 242/72.5, 73; 269/48.1, 34, 267, 9; 82/44; 74/49, 103, 99; 294/88, 116, 115, 106

[56] References Cited

U.S. PATENT DOCUMENTS

| | | | |
|---|---|---|---|
| 1,523,063 | 1/1925 | Fuchs | 294/115 |
| 1,813,695 | 7/1931 | Brockschmidt | 294/115 |
| 1,967,731 | 7/1934 | Ackerman | 294/115 |
| 2,641,806 | 6/1953 | Leckrone | 294/88 |
| 3,797,324 | 3/1974 | Sheesley | 74/99 |

Primary Examiner—Samuel Scott
Assistant Examiner—Gerry Anderson
Attorney, Agent, or Firm—Tod R. Nissle

[57] ABSTRACT

An improved mechanism for converting the reciprocal motion of a drive member to pivotal motion of one or more levers includes a tooth member-receiving slot pair operatively connecting the drive member to the levers. The tooth member extends perpendicular to the axis of reciprocation of the drive member and the slot receives the tooth member in driving engagement therewith. Either the tooth member or the slot has a convex cam surface formed thereon and the other member of the pair has a flat cam-engaging surface. Rolling contact is thereby provided between the drive member and the levers when the drive member is actuated for reciprocal movement.

1 Claim, 5 Drawing Figures

MOTION CONVERSION MECHANISM

This invention relates to an improved motion conversion mechanism.

More specifically, the invention concerns an improved motion conversion mechanism for converting reciprocal motion of a drive member to produce pivotal movement of one or more levers with which the drive member is operatively engaged.

In still another respect, the invention concerns an improved motion conversion mechanism of the type described in which the operative connection between the drive member and the lever or levers is a tooth member-receiving slot pair which has surfaces contoured to provide rolling contact therebetween as distinguished from so-called "knife edge" point contact or sliding contact.

In still another, further and more specific respect, the invention pertains to an improved hydraulically actuated "pick and place" cylinder especially adapted for use with automatic feeding equipment in manufacture and assembly operations involving the handling of various articles such as miniaturized electronic components, etc.

Prior art motion conversion mechanisms, particularly adapted for manipulating parts of varying sizes and shapes in high-speed production operations, have generally consisted of a housing portion which carries a hydraulically or mechanically actuated reciprocating drive member. Levers which function as fingers to grasp the article are pivotally mounted at spaced points on the housing and are operatively connected to the drive member by a linking mechanism. The linking mechanism typically consists of a projection or "tooth" carried by the drive member which extends perpendicularly to the axis of reciprocation. The tooth is engaged and retained within recesses formed in the levers. In one prior art mechanism, the levers are provided with spaced opposed knife edge portions which contact the tooth portion of the drive member to produce a sort of "point" contact which is said to be a "low friction" drive. In another prior art device, the tooth portion extending perpendicularly to the axis of reciprocation of the drive member terminates in a ring of circular cross-section. The ring portion of the tooth is received within a slot formed in the pivoted levers. Reciprocal movement of the drive member results in force being transmitted to the levers by means of the sliding action of the ring surfaces upon the mating surfaces of the slots formed in the finger levers.

The so-called "point contact" mechanism described above does provide a relatively low friction linkage between the drive member and the pivoted levers but, because of the small area of contact between the finger and its mating surface, loading forces are correspondingly high. The sliding-contact linkage described above reduces the loading force per unit area at the point of contact between the ring and its mating surface, but the sliding-contact linkage produces higher friction losses and, if the unit loadings are high enough, produces galling.

To remedy the deficiencies of the prior art motion conversion mechanisms, described above, it would be highly advantageous to provide a motion conversion mechanism especially adapted for use in pick and place cylinders for high-speed automated production operations in which the linking mechanism between the drive member and the lever fingers utilizes "rolling" contact between the mating surfaces of the mechanism.

It is, therefore, a principal object of the present invention to provide an improved motion conversion mechanism.

Still another object of the invention is to provide an improved motion conversion mechanism for use in pick and place cylinders for high-speed automated processing equipment.

Still another and further object of the invention is to provide a motion conversion mechanism of the type described in which the linking mechanism between the drive member and the pivoted lever fingers involves "rolling" contact between mating surfaces rather than knife edge or sliding contact.

These and other, further and more specific objects and advantages of the invention will be apparent to those skilled in the art from the following detailed description thereof, taken in conjunction with the drawings, in which.

Figure 1:
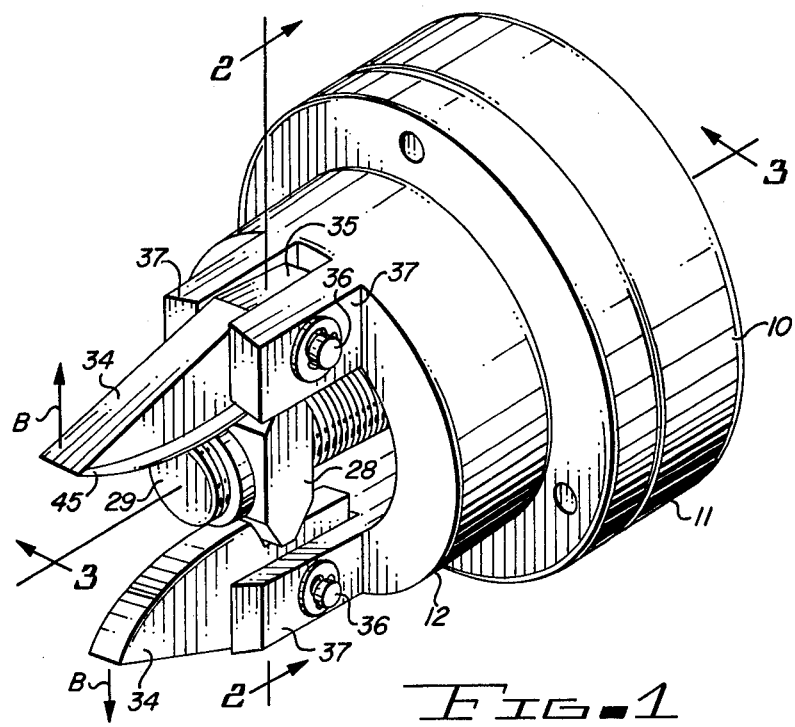
FIG. 1 is a perspective view of a pick and place cylinder incorporating the principles of the present invention.
Figure 2:
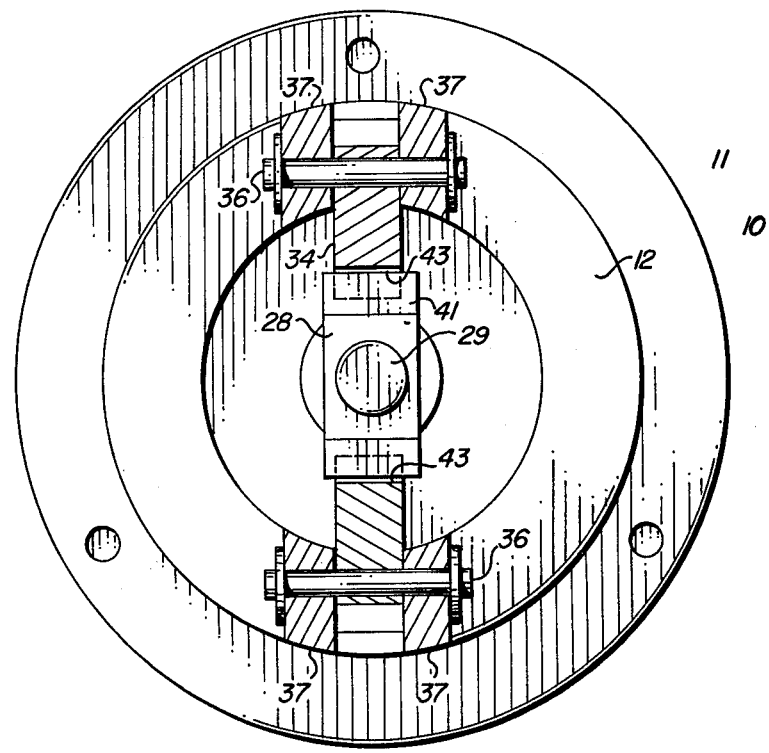
FIG. 2 is a sectional view of the cylinder of FIG. 1, taken along section line 2—2 thereof.
Figure 3:
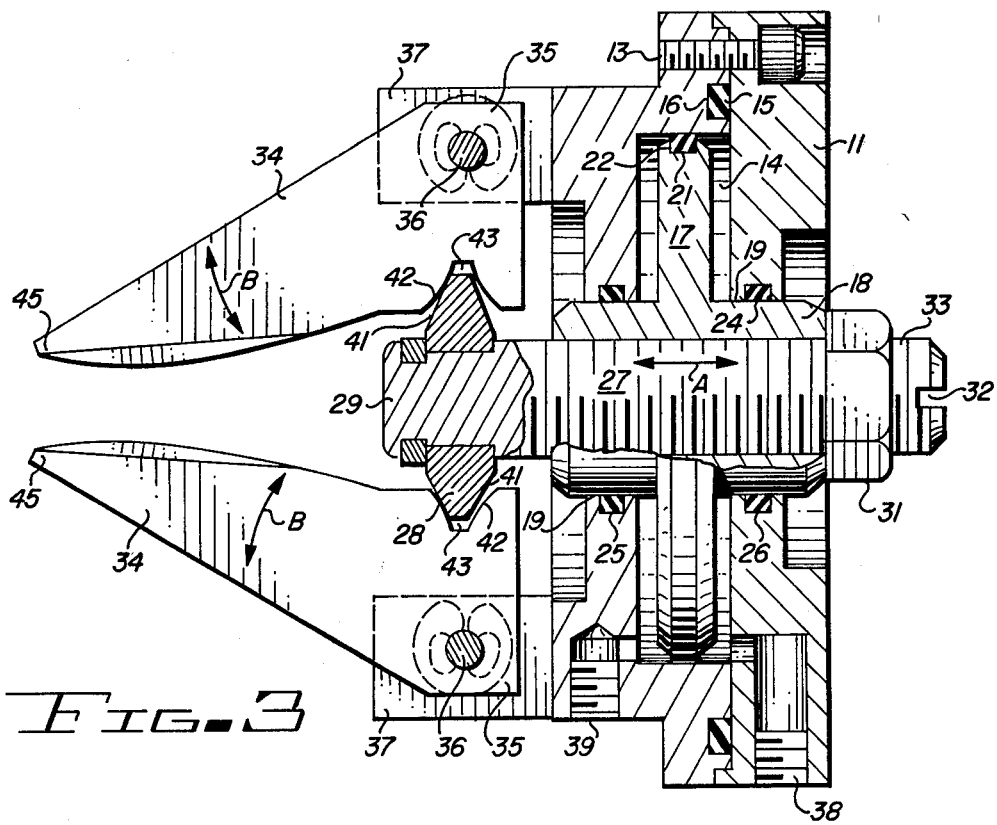
FIG. 3 is a sectional view of the cylinders of FIGS. 1-2, taken along section line 3—3 of FIG. 1.
Figure 4:
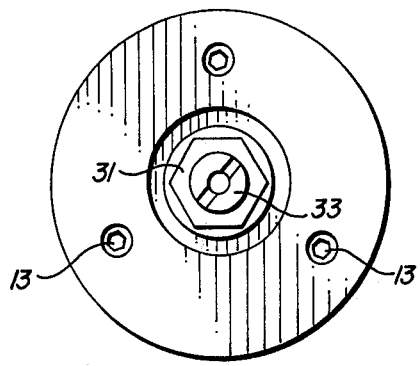
FIG. 4 is a plan view of the rear surface of the cylinder of FIGS. 1-3.

Briefly, in accordance with my invention, I provide an improved motion conversion mechanism. The mechanism generally includes a housing, spaced levers pivotally mounted upon the housing, a reciprocal lever-drive member mounted in the housing and means operatively connecting the drive member to the levers for causing the levers to move about their respective pivotal mountings in response to reciprocal movement of the drive member.

The improvements in this general type of motion conversion mechanism which are comprehended by the present invention include means for operatively connecting the drive member to the levers comprising a tooth member-receiving slot pair, the tooth member extending perpendicular to the axis of reciprocation of the drive member and means defining a slot for receiving the tooth member in driving engagement therewith. One of said pair, i.e., either the tooth member or the slot, is carried by the drive member and the other of the pair is carried by the spaced levers pivoted on the motion conversion mechanism housing.

One of the pair, i.e., either the tooth or the slot, has a convex cam surface formed thereon and the other of the pair has a flat cam-engaging surface formed thereon to provide rolling contact between the convex cam surface and the flat cam-engaging surface when the drive member is actuated for reciprocal movement.

Turning now to the drawings, in which like reference characters identify the same elements in the several views, FIGS. 1-4 illustrate a motion conversion mechanism incorporating the presently preferred embodiment of the invention. The motion conversion mechanism includes a generally cylindrical housing 10 formed by securing a cover member 11 to a cylinder member 12 by means of machine screws 13. The cylinder member 12 is provided with a recess 14 which, with the cover member 11, defines an operating cylinder. The juncture of the cover member 11 and the cylinder member 12 is sealed by a gasket 15 seated in a circumferential groove 16 formed in the rear face of the cylinder member 12.

The cylinder 14 encloses a piston 17 integrally formed with a drive member 18 which is slidably disposed within a cylindrical bore 19 formed in the cylinder member 12 and rear cover plate 11. The periphery of the piston 17 is hydraulically sealed against the outer wall of the cylinder 14 by an O-ring 21 seated in a groove 22 formed in the periphery of the piston 17. O-ring seals 23 and 24 seated in grooves 25 and 26 formed, respectively, in the periphery of the bore 19 form hydraulic seals between the drive member 18 and the bore 19. The drive member 18 is internally threaded to receive and engage a threaded adjusting screw 27 which carries a tooth member 28 on its forward end 29.

The axial position of the threaded adjusting screw 27 relative to the drive member 18 may be varied by loosening the locking nut 31 and rotating the adjusting screw 27 by means of a screwdriver (not shown) inserted in the slot 32 formed in the rear end 33 of the adjusting screw 27. Lever fingers 34 are pivotally mounted at their respective inner ends 35 on the housing 10 by means of pins 36 inserted through registering holes in upstanding boss members 37 formed integrally with the cylinder member 12.

In operation, a hydraulic fluid, either a liquid or a compressed gas, is admitted under pressure through either of the inlet-outlet ports 38 or 39 to the interior of the cylinder 14 to act on the piston 17 and cause reciprocal movement in the directions of the arrows A of the drive member 18 within the bore 19, causing the tooth cam-engaging surfaces 41 to bear against mating cam surfaces 42 which form the diverging edges of a receiving slot 43 formed in the inner rear edge 44 of the level fingers 34, causing pivotal movement in the directions of the arrows B of the tips 45 of the level fingers 34.

Figure 5:
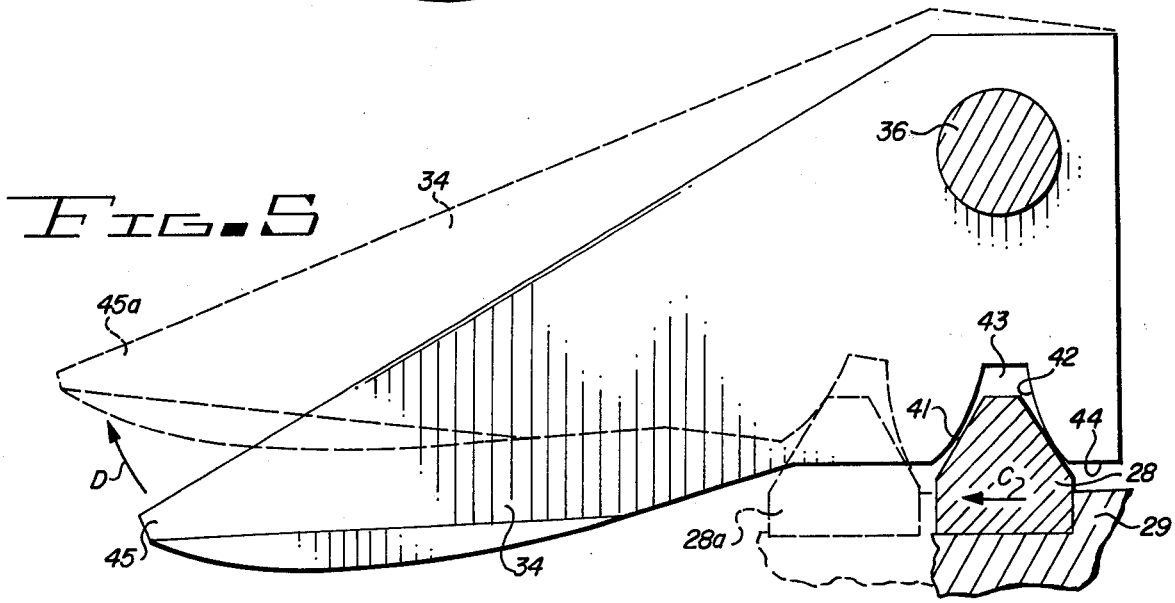
FIG. 5 is a kinematic scetch illustrating the relative movement between the drive member and the pivoted lever fingers of the pick and place cylinder of FIGS. 1-4.

FIG. 5 illustrates in greater detail the mode of contact between the tooth member 28 and the mating surfaces of the slot 43 formed in the inner rear edge 44 of the lever fingers 34. As the tooth member 28, carried on the adjusting screw 29, moves forward in the direction of the arrow C to the position indicated by the dashed lines 28a, the tip 45 of the lever finger 34 moves outwardly in the direction of the arrow D to the position shown by the dashed lines 45a as the lever finger 34 pivots around the pin 36. The flat cam-engaging surface 41 bears against the mating convex cam surface 42 forming the forward diverging edge of the slot 43 in the finger member 34. As will be observed from FIG. 5, there is rolling engagement, as distinct from sliding engagement, between the cam-engaging surface 41 and the cam surface 42 as the cam-actuating tooth 28 moves to the position indicated by the dashed lines 28a and as the finger 34 moves pivotally around the pin 36 to the position indicated by the dashed lines 45a. This rolling action practically eliminates wear of the cam-engaging surfaces 41 and the cam surfaces 42, thus maintaining the desired level of accuracy and repeatability of the movement of the finger levers 34. In fact, the physical properties of the materials forming the cam-engaging tooth 28 and the cam surfaces 42 of the slots 43 in the finger levers 34 are improved by "cold working".

Having described my invention in such clear, concise and exact terms as to enable those skilled in the art to understand and practice it, and having described the presently preferred embodiment thereof, I claim:

1. In a motion conversion mechanism including
   a housing,
   spaced levers pivotally mounted on said housing at their respective inner ends and movable about said pivots toward and away from each other to grasp objects therebetween,
   a reciprocal lever-drive member mounted in said housing, and
   means operatively connecting said drive member and said lever for causing said levers to move about their respective pivotal mountings in response to reciprocal movement of said drive member,
   the improvements in said motion conversion mechanism in which said means for operatively connecting said drive member to said levers comprise a pair including
   (a) a tooth member extending perpendicularly to the axis of reciprocation of said reciprocable lever drive member,
   (b) means defining a slot for receiving said tooth member and in driving engagement therewith,
   said reciprocal lever-drive member carrying one of said pair and each of said spaced levers carrying the other of said pair,
   (c) one of said pair having a convex cam surface formed integrally thereon,
   (d) the other of said pair having a flat cam engaging surface formed thereon,
   to provide rolling contact therebetween when said drive member is actuated for reciprocal movement, free of relative movement between the cam surface and the member on which it is integrally formed.

* * * * *